INVENTORS.
OSCAR E. ROSAEN
NILS O. ROSAEN
BORJE O. ROSAEN

BY Hauke & Hauke

ATTORNEYS

United States Patent Office 3,417,869
Patented Dec. 24, 1968

3,417,869
FILTER DEVICES
Nils O. Rosaen, Bloomfield Hills, Borje O. Rosaen, Ann Arbor, and Oscar E. Rosaen, Grosse Pointe, Mich., assignors to The Rosaen Filter Company, Hazel Park, Mich., a corporation of Michigan
Filed Jan. 24, 1966, Ser. No. 522,775
10 Claims. (Cl. 210—90)

ABSTRACT OF THE DISCLOSURE

A filter device is mounted to the top plate of a fluid reservoir and extends downwardly to position a filter element below the level of fluid in the reservoir. The filter element is supported by a housing mounted within the reservoir so that fluid is drawn from the reservoir through the filter element and through an outlet structure connected with the housing. The filter element is removable vertically upwardly from the housing and from the reservoir.

---

Figure 1:
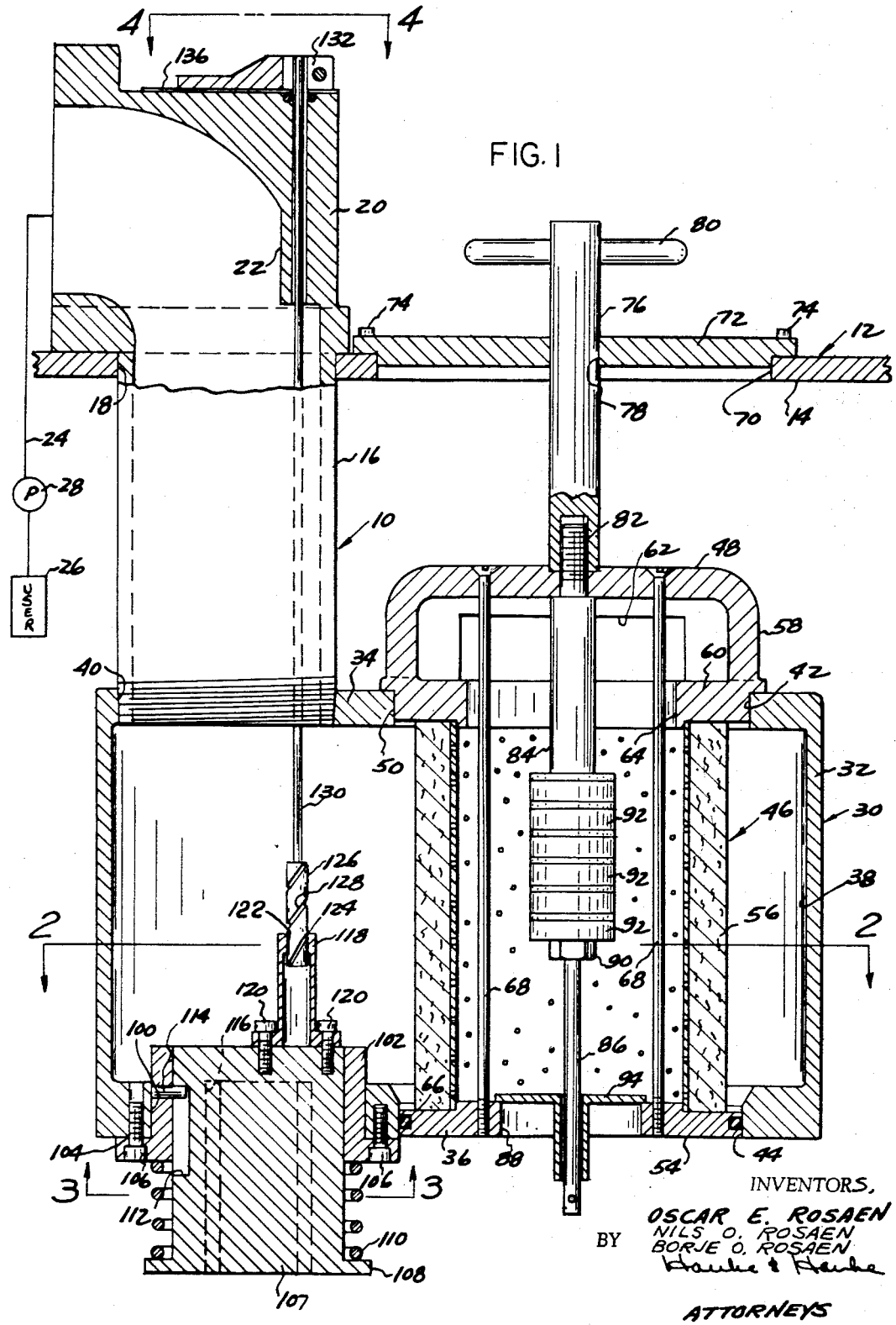

The present invention relates to filter devices and more particularly to such a device adapted to be submerged within a fluid reservoir and constructed to permit continued operation of the system in which the device is connected as the filter element is removed for cleaning or replacement.

Heretofore a number of filter devices have been provided which have permitted continued operation of the fluid system even as the filter element is being removed for purposes of cleaning or replacement. Each of these, however, has included some type of valve means operable upon being actuated to close off portions of the filter device and to redirect fluid directly from the inlet to the outlet. Such valve means in addition to adding considerable cost to the filter devices by being expensive to manufacture and assemble, also are subject to malfunction. When the valve means become worn or when malfunction occurs, fluid continues to be drawn into the filter chamber as the filter element is removed and this can result in a substantial loss of system fluid and a difficult and time consuming clean-up operation. The system must be shut down of course while the valve is repaired or replaced and this too results in loss of time and money.

Filter devices have also been heretofore provided in which the filter element is disposed within the fluid reservoir and fluid is drawn from the reservoir through the filter element and to a fluid user by a suction pump. Such submerged type filter devices have the advantage that the fluid reservoir in effect becomes the housing for the element and this substantially reduces the initial cost of providing a filter device for fluid systems. There are, however, several disadvantages associated with submerged type filter devices. First, the filter element, while it prevents foreign particles entrained in the fluid from passing to the fluid user, does not eliminate such foreign particles from the system but only isolates them in the reservoir. Secondly, removal of the filter element for cleaning or replacement is quite difficult and at least requires shutting down the system and often requires that the reservoir be drained and partially dismantled.

The present invention provides a filter device which overcomes these problems by providing a construction in which the filter element is disposed within the fluid reservoir in a position beneath the minimum level of fluid therein. One surface of the filter element is exposed to the fluid within the reservoir and the opposite side is connected through a fixed housing member to an outlet adapted for connection to a fluid user through a suction pump. Thus, the filter device is of a submerged type. Unlike previous submerged type filter devices, however, means are provided for removing the filter element vertically upwardly from the reservoir without distributing the housing structure so that upon such removal fluid can be continued to be drawn from the reservoir and through the outlet to the fluid user. Means are also provided for removing from the system with the filter element foreign particles collected from the system by the element.

This construction provides a device then which has the advantages of submerged type filter devices but yet permits continued operation of the fluid system to which it is connected even with the filter element entirely removed from the device. Such a result is produced without the necessity of valves or the like for redirecting the fluid upon removal of the filter element and, therefore, without the added costs and dangers which ensue from such valves.

Also, as will become more apparent as the description proceeds, the filter device of the present invention includes a novel means for visually indicating the condition of the filter element exteriorly of the fluid reservoir. This permits cleaning or replacement of the filter element prior to the element becoming unduly clogged. The filter device also includes means for automatically bypassing the filter element upon the filter element becoming clogged to a predetermined degree.

It is an object then of the present invention to reduce the cost of providing continuous fluid systems by providing a filter device for such systems constructed to permit the filter element to be removed for cleaning or replacement without disrupting the operation of the system and without the necessity of providing valve means within the filter device for redirecting fluid as the filter element is removed.

It is another object of the present invention to improve the functioning of those filter devices provided with means for permitting the removal of the filter element without interrupting the operation of the filter system by providing a new filter device constructed to automatically direct fluid from the fluid reservoir and through the outlet of the device upon removal of the filter element without requiring the provision of valve means for this purpose.

It is yet another object of the present invention to improve the filter devices of the aforementioned types by providing an improved means for indicating the clogged condition of the filter element of such devices and also means for automatically bypassing the filter element when it has become clogged to a predetermined degree.

It is still another object of the present invention to improve submerged type filter devices by providing a construction for such devices which permits the filter element to be removed without disrupting operation of the system to which the filter device is connected and by providing means for removing foreign particles collected by the element upon removal of the element.

Still further objects and advantages of the present invention will readily occur to one skilled in the art to which the invention pertains upon reference to the following description. The description refers to the accompanying drawings in which like reference characters refer to to like parts throughout the several views and in which FIG. 1 is a longitudinal cross sectional view of a preferred filter of the present invention mounted in a fluid user and illustrating other preferred components of the preferred system schematically, FIG. 2 is a cross sectional view taken substantially at line 2—2 of FIG. 1.

Figure 2:
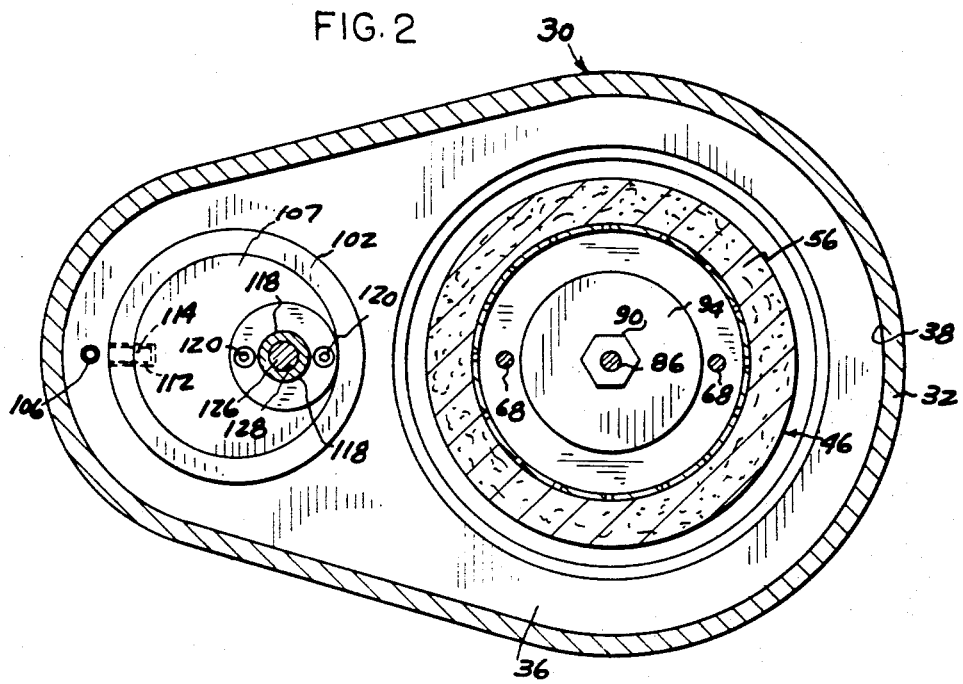
Figure 3:
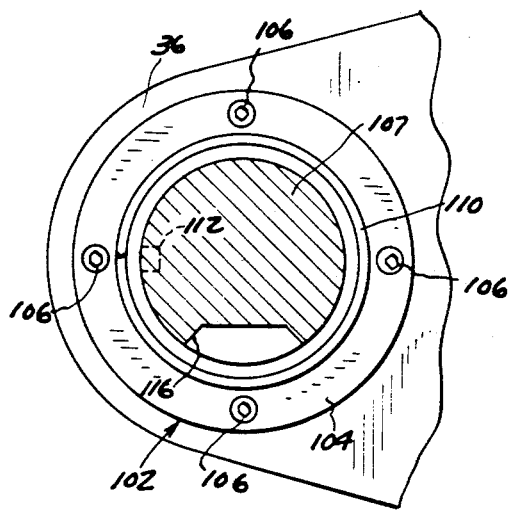
Figure 4:
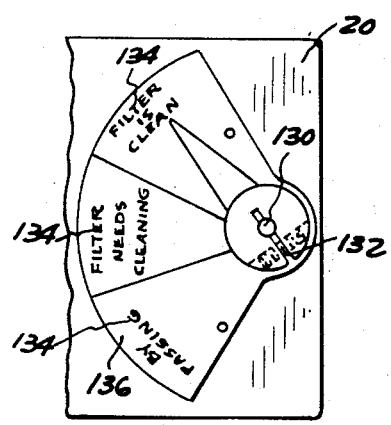

FIG. 3 is a fragmentary cross sectional view taken substantially at line 3—3 of FIG. 1, and FIG. 4 is a fragmentary elevational view as seen substantially from line 4—4 of FIG. 1.

Now referring to the drawings for a more detailed description of the present invention, a preferred filter device 10 is therein illustrated as being mounted to extend vertically into a fluid reservoir 12 from the top wall 14 thereof. The filter device 10 preferably comprises a tubular member 16 extending into the reservoir 12 through a first opening 18 provided in the top wall 14 of the reservoir 12. The upper portion of the tubular member 16 is enlarged to form a portion 20 which is disposed exteriorly of the reservoir 12 and which seats on the upper surface of the top wall 14. The portion 20 is preferably mounted to the top wall 14 by any convenient means such as screws (not shown). The portion 20 forms an outlet passage 22 connected with the interior of the tubular member 16 and adapted for connection by suitable conduit 24 to a fluid user 26 through a suction pump 28 as shown schematically in FIG. 1.

An inner housing member 30 is disposed within the reservoir 12 well below the minimum level of fluid therein and preferably comprises an arcuate wall portion 32 extending on a vertical axis and integrally joined with a top plate 34 and a bottom plate 36 forming a chamber 38. The top plate 34 is provided with spaced circular openings 40 and 42. The portion of the top plate 34 forming the opening 40 is provided with threads for receiving the threaded lower end of the tubular member 16 so that in this manner the tubular member 16 and the inner housing 30 are secured together and the interior of the tubular member 16 is open to the chamber 38.

The bottom plate 36 is provided with a circular opening 44 axially aligned with and substantially equal in size to the opening 42. The openings 42 and 44 provide the means for mounting a filter assembly 46 in position. The filter assembly 46 preferably comprises an upper member 48 having an annular peripheral shoulder portion 50 adapted to seat within the opening 42, a lower circular member 54 adapted to axially slidably fit within the opening 44 and a cylindrical filter element 56 sandwiched therebetween and disposed within the chamber 38.

The upper member 48 further comprises an inverted cup shape portion 58 integrally joined with a lower circular portion 60. The portion 58 is provided with a plurality of annularly spaced openings 62 and the circular portion 60 is provided with a central opening 64 so that the interior of the filter element 56 is in open communication with the interior of the reservoir 12 through the openings 62 and 64.

The lower circular member 54 preferably carries an O-ring seal 66 on its peripheral edge to prevent fluid passage therepast. A plurality of annularly spaced screws 68 extend between the upper member 48 and the lower member 54 to secure the members together and the filter element 56 therebetween.

The top wall 14 of the reservoir 12 is provided with a second circular opening 70 axially aligned with the openings 42 and 44. The opening 70 is closed by a cap member 72 removably secured to the top wall 14 by screws 74. A rod 76 extends axially through a central opening 78 provided in the cap member 72 and is provided at its exterior end with a handle 80. The interior end of the rod 76 is provided with an internally threaded axial portion 82 which axially receives the threaded upper end of a rod 84 to thereby secure the upper member 48 and the filter assembly 46 to the rod 76 and the cap member 72.

The rod 84 extends axially through the opening 64 and into the interior of the filter element 56. A reduced portion 86 of the rod 84 extends axially through a central opening 88 provided in the lower member 54. A nut 90 carried on the reduced portion 86 provides the means for locking a plurality of magnets 92 to the rod 84 and in a position disposed within the filter element 56. A circular valve member 94 is axially slidably carried on the lower end of the reduced portion 86 and is operable to slide by gravity to a position closing the opening 88.

As the invention has thus far been described, fluid is drawn from the reservoir 12 by the pump 28 through the openings 62 and 60 into the interior of the filter element 56. Since the valve member 94 is retained in position only by gravity, the drawing action of the pump 28 will cause the valve 94 to be moved axially upwardly on the reduced rod portion 86 so that fluid will also enter the interior of the filter element 56 through the opening 88. The fluid will be drawn radially outwardly through the filter element 56 and into the chamber 38 from whence it will pass vertically upwardly through the tubular housing 16 and the outlet passage 22 to the fluid user 26.

When it is desired to clean or replace the filter element 56 the screws 74 are removed and the handle 80 is grasped to move the filter assembly 46 vertically upwardly through the openings 42 and 70. As the filter assembly 46 is moved upwardly through the fluid the force of the fluid acting on the upper surface of the valve 94 will maintain the opening 88 closed so that foreign particles collected on the interior of the element 56 will not escape back into the reservoir 12 and will be removed from the system with the filter assembly 46.

As the filter assembly 46 is being removed and even after it has been removed completely from the system the pump 28 can continue to operate and will continue to draw fluid from the reservoir 12 through the openings 42 and 44.

After the filter element 56 has been cleaned or replaced, the filter assembly 46 will be reinstalled within the housing 30. As the filter assembly 34 is being moved vertically downwardly through the fluid during replacement, the valve 94 will be moved upwardly by the force of the fluid acting on the bottom surface to maintain the opening 88 unobstructed. This permits air which might otherwise become entrapped on the underside of the filter assembly 46 to rise through the opening 88 to the top of the reservoir 12 before it can be drawn through the filter element 56 and thereby possibly interfere with operation of the system.

The filter device of the present invention also includes a novel means for indicating the condition of the filter element 56 exteriorly of the fluid reservoir and a means for automatically bypassing the filter element upon the filter element becoming clogged a predetermined amount.

The lower wall 36 of the housing 30 is provided with a second opening 100 which is positioned beneath the opening 40 provided in the top wall 34. As can best be seen in FIGS. 1 and 3, a cylindrical fitting 102 is disposed within the opening 100 and is mounted to the lower wall 36 by means of a flange portion 104 and screws 106. A valve member 107 is axially slidably mounted within the interior of the fitting 102 and is provided with a peripheral flange 108 at its exterior end. A spring 110 is biased between the exterior edge of the fitting 102 and the flange 108.

As can best be seen in FIG. 3, an axial slot 112 is provided in the periphery of the valve member 106 and the slot 112 as can best be seen in FIG. 1 is substantially less than the length of the valve member 106 and receives a transversely extending pin 114 carried by the fitting 102. The slot 112 and pin 114 limit axial movement of the valve member 107 and the spring 110 urges the valve member 107 toward a position in which the pin 114 is disposed at the inner end of the slot 112.

As can best be seen in FIG. 3 a portion of the peripheral edge of the valve member 107 is removed to form an axially extending opening 116 which as can best be seen in FIG. 1 begins at a point spaced from the interior end of the valve member 107 and extends to the exterior end thereof. The opening 116 is dimensioned such that it is normally not in registry with the chamber 38 but upon sufficient axial movement of the valve member 107 opens a path directly from the interior of the reservoir 12 to the chamber 38.

It is apparent that the valve member 107 is subjected on its interior surface to the pressure within chamber 38 and thus to the pressure on the outlet side of the filter element 56. The exterior surface of the valve member 107 is subjected to pressure in the fluid reservoir 12 and thus to the pressure on the inlet side of the filter element 56. As the filter element becomes clogged, the pressure differential across the element begins to increase. When this pressure differential has increased sufficiently to overcome the spring 110, the valve member 107 will begin to move axially inwardly within the fitting 102. The extent of the movement will be in direct correspondence with the degree of clogging of the filter element 56 and when the element has reached a predetermined clogged degree, the valve member 107 will have moved sufficiently to open a bypass path through the opening 116 directly from the reservoir 12 to the chamber 38 and thereby bypassing the filter element 56.

Since the movement of the valve member 107 is in direct correspondence with the degree of clogging of the filter element 56 and the bypass path is not opened until the element 56 has reached a predetermined degree of clogging, by providing a means for indicating the position of the valve member 107 exteriorly of the device, means will also thereby be provided for indicating the condition of the filter element 56.

In the present invention such means comprise a hollow substantially cyindrical member 118 mounted by screws 120 to extend axially from the interior end of the valve member 107. The inner end of the cylindrical member 118 is provided with an axial opening 122 which as can best be seen in FIG. 1, is fashioned with a radially inwardly extending tooth 124 formed to extend inwardly from the upper end thereof. An actuator element 126 extends axially into the opening 120 and is provided with a helical groove 128 on its exterior surface which extends from one end to the other of the actuator element 126 and which receives the tooth 124 so that axial movement of the member 118 as produced by axial movement of the valve member 107 is transmitted through the tooth 124 and groove 128 to produce a corresponding axial movement of the actuator element 126.

The actuator element 126 is carried on the lower end of an elongated shaft 130. The shaft 130 rotates with the actuator element 126 and extends through the portion 20 of the tubular housing 16. The shaft 130 carries at its exterior end a pointer element 132 which as can best be seen in FIG. 4, points to suitable indicia 134 provided on an exteriorly mounted indicator plate 136. The pointer element 132 rotates with the shaft 130 and thus with suitable indicia 134 indicates the condition of the filter element 56 by indicating the position of the valve member 107.

It is apparent that a filter device has been described which has the advantages of submerged type filter devices and yet which overcomes the problems and disadvantages heretofore associated with such devices. Means are provided for easily removing the element for cleaning or replacement without disrupting the operation of the system. Foreign particles collected by the element are removed from the system with the element. In addition, means are provided for automatically bypassing the filter device upon the filter element becoming clogged a predetermined amount. A new means is also provided for indicating the condition of the element exteriorly of the device.

It is also apparent that although we have disclosed but one embodiment of the present invention many changes and modifications can be made therein without departing from the spirit of the invention as expressed by the appended claims.

We claim:

1. A filter device adapted to be mounted to the top of a closed reservoir and to extend downwardly into the reservoir comprising
   (a) a housing disposed within said reservoir below the level of fluid therein and having a top plate,
   (b) said housing forming a chamber and a tubular member mounted to said top plate and extending from the upper portion of said housing through the top of said reservoir to form an outlet passage connected with said chamber,
   (c) said top plate having an upper opening axially parallel to said tubular member and spaced therefrom to provide an inlet means connecting the interior of said reservoir with said chamber, a filter assembly and means removably mounting said filter assembly in said opening intermediate the inlet means and the outlet passage, and
   (d) said reservoir having an opening axially aligned with the opening in said top plate for vertically removing said filter assembly from said reservoir.

2. The filter device as defined in claim 1 and including pressure responsive means carried by said housing and operable upon a predetermined increase in the pressure differential across said filter assembly to open a bypass path directly from the interior of said reservoir to said chamber.

3. The filter device as defined in claim 2 and including means connected with said pressure responsive means and operable to indicate the position of said pressure responsive means exteriorly of said reservoir.

4. The filter device as defined in claim 1 and including pressure responsive means carried by said housing and movable in response to changes in the pressure differential across said filter assembly, and means operably connected to said pressure responsive means to indicate the position thereof exteriorly of said reservoir.

5. The filter device as defined in claim 1 and in which said filter assembly comprises,
   (a) a first flanged member, a second flanged member and a cylindrical filter element disposed therebetween, and
   (b) said first flanged member being adapted to seat in said opening in said top plate and being provided with openings connecting said reservoir with the interior of said filter element.

6. The device as defined in claim 5, and in which said housing is provided with a bottom plate, said bottom plate having an opening axially aligned with said opening in said top plate, said filter assembly further comprising
   (a) said second flanged member being seated in said opening in said bottom plate and being provided with an opening connecting the interior of said reservoir with the interior of said filter element, and
   (b) a gravity positioned valve means carried by said filter assembly in a position to close the opening in said second flange member.

7. The device as defined in claim 5 and including a rod fixed to said first flange member and extending vertically upwardly to a position adjacent said top of said reservoir.

8. The device as defined in claim 1 and in which said housing is provided with a bottom plate, and including
   (a) valve means carried in said bottom plate,
   (b) means urging said valve means to a normally closed position,
   (c) said valve means having one surface exposed to fluid within said reservoir and an opposite surface exposed to fluid within said chamber and being movable in response to changes in the pressure differential thereacross against said urging means toward a position opening fluid flow directly from said reservoir to said chamber.

9. The device as defined in claim 8 and including means operably connected to said valve means to indicate the position thereof exteriorly of said reservoir.

10. The device as defined in claim 9 and in which said last mentioned means comprises (a) a cylindrical member carried on said valve means to move axially upon axial movement of said valve means,
(b) said cylindrical member having a radially inwardly extending tooth,
(c) an actuator member carried within said cylindrical member and having a helical groove on the exterior surface receiving said tooth whereby axial movement of said cylindrical member produces a corresponding rotational movement of said actuator member,
(d) a shaft fixed to said actuator member to be rotated therewith and a pointer member carried exteriorly of said reservoir and on the free end of said shaft.

References Cited

UNITED STATES PATENTS

| | | | |
|---|---|---|---|
| 1,817,572 | 8/1931 | Linley et al. | 210—172 |
| 2,358,748 | 9/1944 | Thompson | 210—172 |
| 2,795,332 | 6/1957 | Burla | 210—172 X |
| 3,288,290 | 11/1966 | Rosaen | 210—90 |

SAMIH N. ZAHARNA, *Primary Examiner.*

U.S. Cl. X.R.

210—130, 172